US011869416B2

(12) United States Patent
Park et al.

(10) Patent No.: US 11,869,416 B2
(45) Date of Patent: Jan. 9, 2024

(54) DISPLAY DEVICE USING SEMICONDUCTOR LIGHT-EMITTING ELEMENT

(71) Applicant: LG ELECTRONICS INC., Seoul (KR)

(72) Inventors: Byunghun Park, Seoul (KR); Sunghwan Kim, Seoul (KR); Hongkyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/798,617

(22) PCT Filed: Feb. 17, 2020

(86) PCT No.: PCT/KR2020/002196
§ 371 (c)(1),
(2) Date: Aug. 10, 2022

(87) PCT Pub. No.: WO2021/162154
PCT Pub. Date: Aug. 19, 2021

(65) Prior Publication Data
US 2023/0095418 A1 Mar. 30, 2023

(30) Foreign Application Priority Data
Feb. 11, 2020 (KR) ........................ 10-2020-0016568

(51) Int. Cl.
*G06F 3/0354* (2013.01)
*G09G 3/32* (2016.01)
*G09G 3/00* (2006.01)

(52) U.S. Cl.
CPC ............... *G09G 3/32* (2013.01); *G09G 3/035* (2020.08); *G09G 2300/0408* (2013.01);
(Continued)

(58) Field of Classification Search
CPC .. G09G 3/32; G09G 3/035; G09G 2300/0408; G09G 2300/0857; G09G 2310/0243; G09G 2310/08
See application file for complete search history.

(56) References Cited

U.S. PATENT DOCUMENTS 5,712,652 A * 1/1998 Sato .................... G06F 3/03542 345/55
2009/0251531 A1* 10/2009 Marshall ............. H04N 13/341 348/E13.001
(Continued)

FOREIGN PATENT DOCUMENTS

JP 2006-146167 A 6/2006
KR 10-1998-060362 A 10/1998
(Continued)

*Primary Examiner* — Lin Li
(74) *Attorney, Agent, or Firm* — Birch, Stewart, Kolasch & Birch, LLP

(57) ABSTRACT

Discussed is a display device including a substrate, semiconductor light-emitting elements on the substrate, flip-flops which can apply an electrical signal to the semiconductor light-emitting elements to maintain the semiconductor light-emitting elements in a light-emitting state for a predetermined time interval, scan electrodes and data electrodes electrically connected to the flip-flops, respectively, and a driver. When a frame synchronization signal is generated during a time interval from a time point of the generation of a sub field signal to a time point of the generation of a subsequent sub field signal, the driver can prevent a voltage from being applied to the data electrodes for the time interval.

17 Claims, 15 Drawing Sheets

(52) U.S. Cl.
CPC ............... *G09G 2300/0857* (2013.01); *G09G 2310/0243* (2013.01); *G09G 2310/08* (2013.01)

(56) References Cited

U.S. PATENT DOCUMENTS

| | | | | |
|---|---|---|---|---|
| 2015/0054718 | A1* | 2/2015 | Kaplan | G09G 3/3258 345/76 |
| 2016/0322003 | A1 | 11/2016 | Nakajima et al. | |

FOREIGN PATENT DOCUMENTS

| | | | |
|---|---|---|---|
| KR | 10-2015-0022236 | A | 3/2015 |
| KR | 10-2015-0077807 | A | 7/2015 |

* cited by examiner

DISPLAY DEVICE USING SEMICONDUCTOR LIGHT-EMITTING ELEMENT

CROSS REFERENCE TO RELATED APPLICATIONS

This application is the National Stage filing under 35 U.S.C. 371 of International Application No. PCT/KR2020/002196, filed on Feb. 17, 2020, which claims the benefit of earlier filing date of and rights of priority to Korean Patent Application No. 10-2020-0016568 filed on Feb. 11, 2020, the contents of all these applications are hereby expressly incorporated by reference into the present application.

TECHNICAL FIELD

The present disclosure relates to a display device, and more particularly, to an image processing method using flip-flops.

BACKGROUND ART

In recent years, display devices having excellent characteristics such as low profile, flexibility and the like have been developed in the field of display technology. On the contrary, currently commercialized major displays are represented by liquid crystal displays (LCDs) and active-matrix organic light-emitting diodes (AMOLEDs).

On the other hand, light-emitting diodes (LEDs) are well known light-emitting elements for converting an electrical current to light, and have been used as a light source for displaying an image in an electronic device including information communication devices since red LEDs using GaAsP compound semiconductors were made commercially available in 1962, together with a GaP:N-based green LEDs. Accordingly, the semiconductor light-emitting elements may be used to implement a display, thereby presenting a scheme for solving the problems.

On the other hand, currently commercialized active-matrix displays require micro-ICs. In this case, a semiconductor light-emitting element must be physically bonded onto a substrate on which the micro-IC is disposed, but there is a problem in that it is very difficult to bond the semiconductor light-emitting element in a micro unit at an accurate position. In addition, according to the above-described method, there is a problem in that it is difficult to inspect or repair a defect after bonding the semiconductor light-emitting element.

DISCLOSURE OF INVENTION

Technical Problem

An aspect of the present disclosure is to implement an active-matrix display device using only flip-flops without a separate micro-IC.

Another aspect of the present disclosure is to minimize a time period (sleep time period) in which all semiconductor light-emitting elements provided in a display device are collectively turned off.

Solution to Problem

A display device according to the present disclosure may include a substrate, a plurality of semiconductor light-emitting elements disposed on the substrate, flip-flops that apply an electric signal to the semiconductor light-emitting elements to allow the semiconductor light-emitting elements to maintain a light-emitting state for a predetermined time period, scan electrodes and data electrodes electrically connected to each of the flip-flops, and a drive unit that generates a frame synchronization signal and a sub-field signal, receives a data packet based on the sub-field signal, and applies a voltage to a scan electrode and a data electrode based on the data packet, wherein when the frame synchronization signal is generated during a time period from a time point at which the sub-field signal is generated to a time point at which a next sub-field signal is generated, the drive unit prevents a voltage from being applied to the data electrodes for the time period from the time point at which the sub-field signal is generated to the time point at which the next sub-field signal is generated.

In an embodiment, the number of sub-field signals generated for a time interval from a time point at which a first frame synchronization signal is generated to a time point at which the next frame synchronization signal is generated, and the number of sub-field signals generated for a time interval from a time point at which a second frame synchronization signal is generated to a time point at which a next frame synchronization signal is generated may be different from each other.

In an embodiment, the drive unit may generate the frame synchronization signal and the sub-field signal out of synchronization with each other.

In an embodiment, a time interval at which the sub-field signal is generated may be the same within a predetermined error range.

In an embodiment, the drive unit may receive a data packet for a time period from a time point at which the sub-field signal is generated to a time point at which a next sub-field signal is generated, and apply a voltage to the scan electrode and the data electrode based on the data packet.

In an embodiment, the data packet may include a block related to data electrodes and a block related to scan electrodes, and the drive unit may sequentially receive a block related to data electrodes and a block related to scan electrodes.

In an embodiment, the drive unit may apply a voltage to at least some of the scan electrodes based on a block related to the scan electrodes while applying a voltage to at least some of the data electrodes based on a block related to the data electrodes.

In an embodiment, a data packet input to the drive unit may include first and second data packets, and a time interval from a time point at which the first data packet starts to be input to a time point at which the drive unit turns on a semiconductor light-emitting element based on the first data packet and a time interval from a time point at which the second data packet starts to be input to a time point at which the drive unit turns on a semiconductor light-emitting element based on the second data packet may be different from each other.

Advantageous Effects of Invention

According to the present disclosure, one frame is time-divided into a plurality of sub-fields to be driven. Such a driving method may be implemented only with flip-flops. The flip-flop is smaller in size than the micro-IC, and can be stably operated in a saturation region of the MOSFET. Furthermore, a display device according to the present disclosure does not require a capacitor existing in an active-matrix driving method in the related art, thereby making it possible to operate at a high-speed.

On the other hand, the present disclosure may control the turn-on of the semiconductor light-emitting elements based on a sub-field signal that is not synchronized with a frame synchronization signal, thereby minimizing a time period (sleep time period) in which all semiconductor light-emitting elements provided in a display device are collectively turned off.

MODE FOR THE INVENTION

Figure 1:
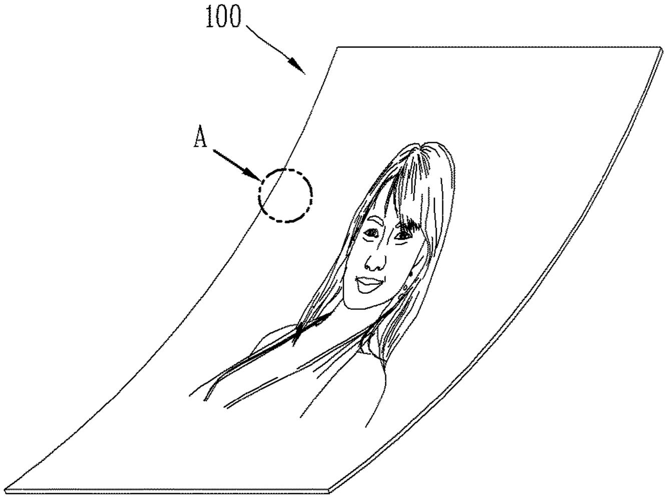
FIG. 1 is a conceptual view showing a display device using a semiconductor light-emitting element according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing an embodiment disclosed herein, moreover, the detailed description will be omitted when specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

Furthermore, it will be understood that when an element such as a layer, region or substrate is referred to as being "on" another element, it can be directly on the another element or an intermediate element may also be interposed therebetween.

A display device disclosed herein may include a portable phone, a smart phone, a laptop computer, a digital broadcast terminal, a personal digital assistant (PDA), a portable multimedia player (PMP), a navigation, a slate PC, a tablet PC, an ultrabook, a digital TV, a desktop computer, and the like. However, it would be easily understood by those skilled in the art that a configuration disclosed herein may be applicable to any displayable device even though it is a new product type which will be developed later.

FIG. 1 is a conceptual view illustrating a display device using a semiconductor light-emitting element according to an embodiment of the present disclosure.

According to the drawing, information processed in the controller of the display device 100 may be displayed using a flexible display.

The flexible display may include a flexible, bendable, twistable, foldable and rollable display. For example, the flexible display may be a display manufactured on a thin and flexible substrate that can be warped, bent, folded or rolled like a paper sheet while maintaining the display characteristics of a flat display in the related art.

A display area of the flexible display becomes a plane in a configuration that the flexible display is not warped (for example, a configuration having an infinite radius of curvature, hereinafter, referred to as a "first configuration"). The display area thereof becomes a curved surface in a configuration that the flexible display is warped by an external force in the first configuration (for example, a configuration having a finite radius of curvature, hereinafter, referred to as a "second configuration"). As illustrated, information displayed in the second configuration may be visual information displayed on a curved surface. The visual information may be realized in such a manner that a light emission of each unit pixel (sub-pixel) arranged in a matrix configuration is controlled independently. The sub-pixel denotes a minimum unit for implementing one color.

The sub-pixel of the flexible display may be implemented by a semiconductor light-emitting element. According to the present disclosure, a light-emitting diode (LED) is illustrated as a type of semiconductor light-emitting element. The light-emitting diode may be formed with a small size to perform the role of a sub-pixel even in the second configuration through this.

Hereinafter, a flexible display implemented using the light-emitting diode will be described in more detail with reference to the accompanying drawings.

Figure 2:
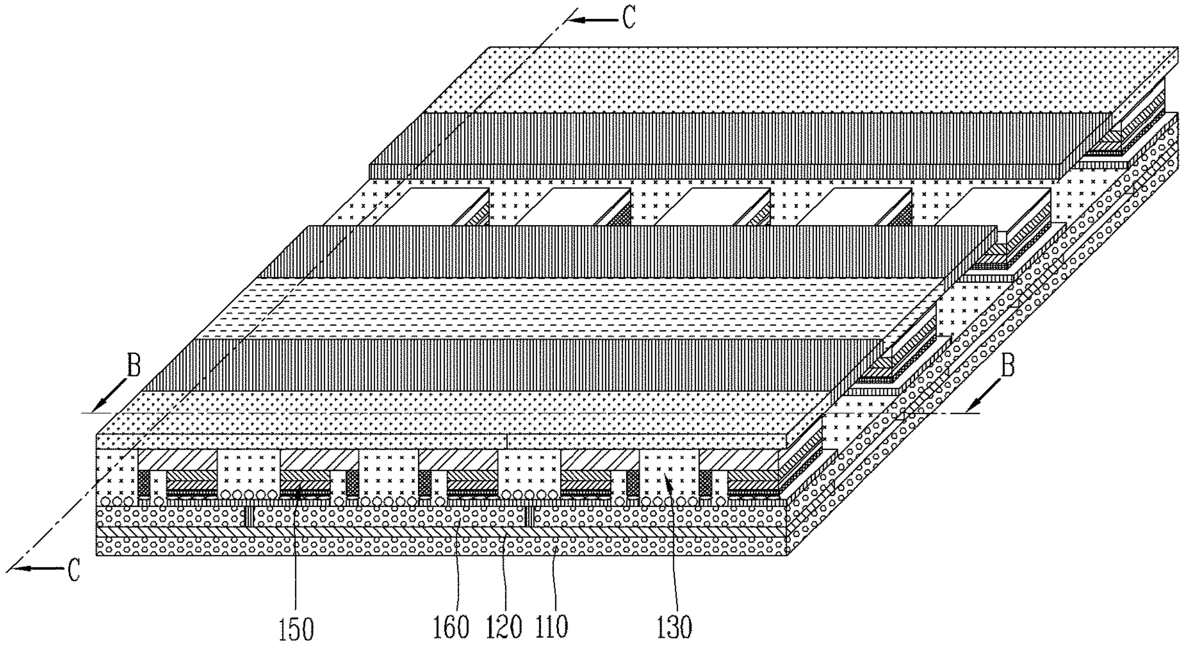
FIG. 2 is a partial enlarged view of portion A in FIG. 1, and FIGS. 3A and 3B are cross-sectional views taken along lines B-B and C-C in FIG. 2.
Figure 3A:
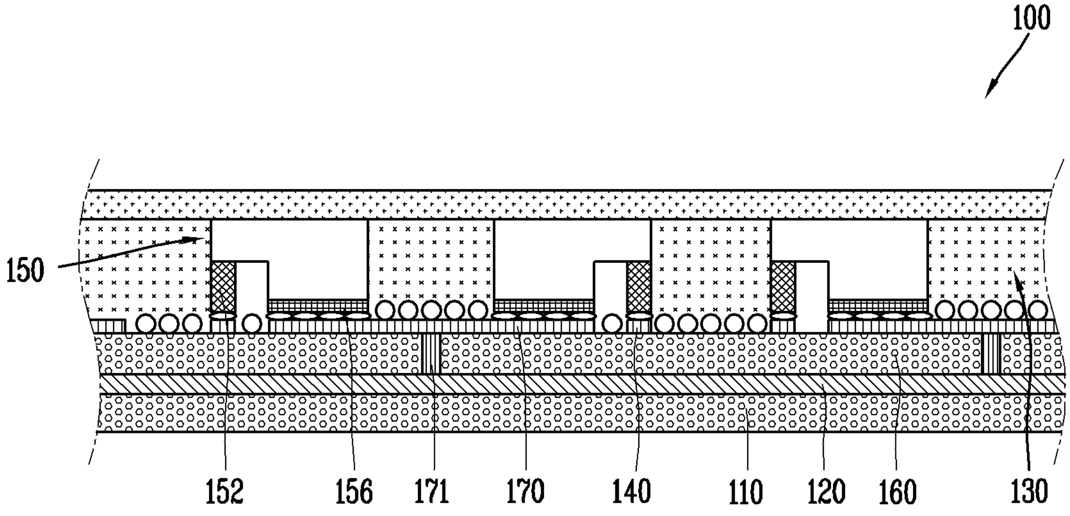
Figure 3B:
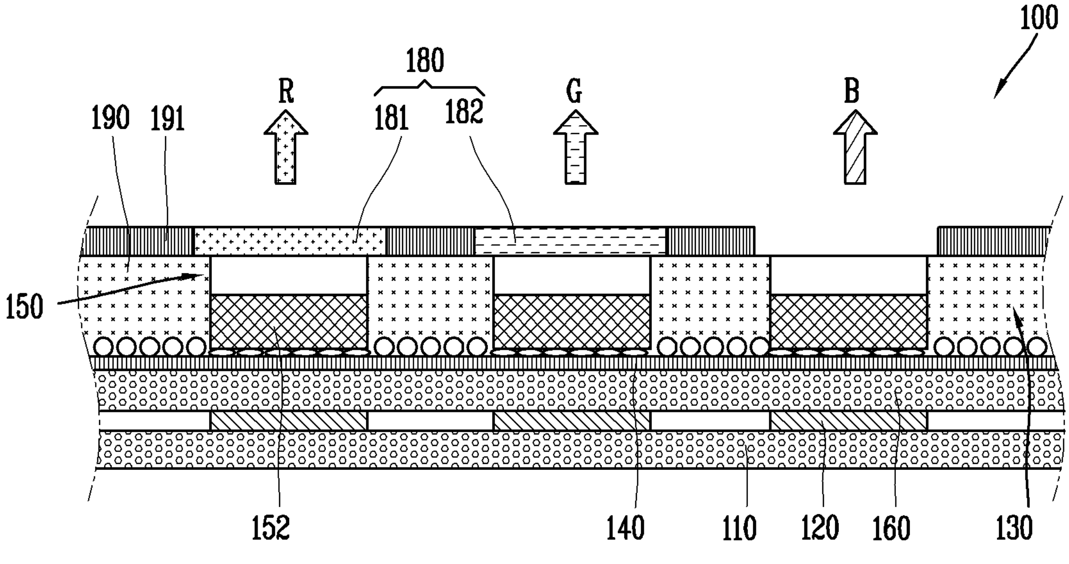
Figure 4:
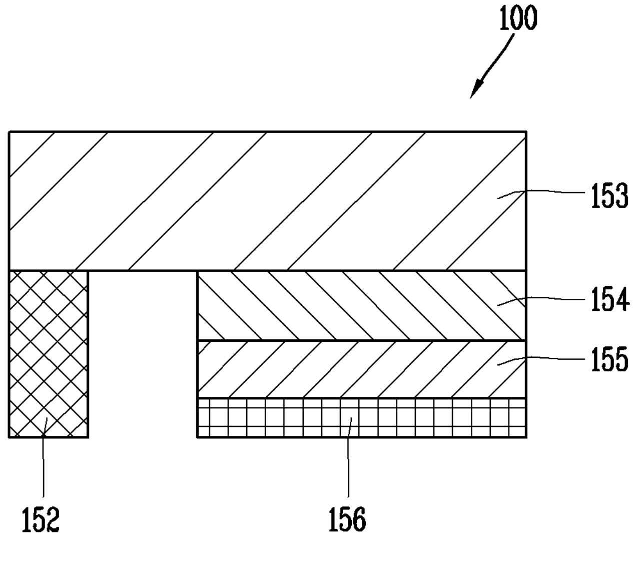
FIG. 4 is a conceptual view illustrating a flip-chip type semiconductor light-emitting element in FIG. 3.

FIG. 2 is a partial enlarged view of portion "A" in FIG. 1, and FIGS. 3A and 3B are cross-sectional views taken along lines B-B and C-C in FIG. 2, FIG. 4 is a conceptual view illustrating a flip-chip type semiconductor light-emitting element in FIG. 3A, and FIGS. 5A through 5C are conceptual views illustrating various forms for implementing colors in connection with a flip-chip type semiconductor light-emitting element.

According to the drawings in FIGS. 2, 3A and 3B, there is illustrated a display device 100 using a passive matrix (PM) type semiconductor light-emitting element as a display device 100 using a semiconductor light-emitting element. However, an example described below may also be applicable to an active-matrix (AM) type semiconductor light-emitting element.

The display device 100 may include a first substrate 110, a first electrode 120, a conductive adhesive layer 130, a second electrode 140, and a plurality of semiconductor light-emitting elements 150.

The first substrate 110 may be a flexible substrate. The first substrate 110 may contain glass or polyimide (PI) to implement the flexible display device. In addition, if it is an insulating and flexible material, any one such as polyethylene naphthalate (PEN), polyethylene terephthalate (PET) or the like may be used. Furthermore, the first substrate 110 may be either one of transparent and non-transparent materials.

The first substrate 110 may be a wiring substrate disposed with the first electrode 120, and thus the first electrode 120 may be placed on the first substrate 110.

According to the drawing, an insulating layer 160 may be disposed on the first substrate 110 placed with the first electrode 120, and an auxiliary electrode 170 may be placed on the insulating layer 160. In this case, a configuration in which the insulating layer 160 is deposited on the first substrate 110 may be a single wiring substrate. More specifically, the insulating layer 160 may be incorporated into the first substrate 110 with an insulating and flexible material such as polyimide (PI), PET, PEN or the like to form a single wiring substrate.

The auxiliary electrode 170 as an electrode for electrically connecting the first electrode 120 to the semiconductor light-emitting element 150 is placed on the insulating layer 160, and disposed to correspond to the location of the first electrode 120. For example, the auxiliary electrode 170 has a dot shape, and may be electrically connected to the first electrode 120 by means of an electrode hole 171 passing through the insulating layer 160. The electrode hole 171 may be formed by filling a conductive material in a via hole.

Referring to the drawings, the conductive adhesive layer 130 may be formed on one surface of the insulating layer 160, but the present disclosure may not be necessarily limited to this. For example, it may be possible to also have a structure in which the conductive adhesive layer 130 is disposed on the first substrate 110 with no insulating layer 160. The conductive adhesive layer 130 may perform the role of an insulating layer in the structure in which the conductive adhesive layer 130 is disposed on the first substrate 110.

The conductive adhesive layer 130 may be a layer having adhesiveness and conductivity, and to this end, a conductive material and an adhesive material may be mixed on the conductive adhesive layer 130. Furthermore, the conductive adhesive layer 130 may have flexibility, thereby allowing a flexible function in the display device.

For such an example, the conductive adhesive layer 130 may be an anisotropic conductive film (ACF), an anisotropic conductive paste, a solution containing conductive particles, and the like. The conductive adhesive layer 130 may allow electrical interconnection in the z-direction passing through the thickness thereof, but may be configured as a layer having electrical insulation in the horizontal x-y direction thereof. Accordingly, the conductive adhesive layer 130 may be referred to as a z-axis conductive layer (however, hereinafter referred to as a "conductive adhesive layer").

The anisotropic conductive film is a film with a form in which an anisotropic conductive medium is mixed with an insulating base member, and thus when heat and pressure are applied thereto, only a specific portion thereof may have conductivity by means of the anisotropic conductive medium. Hereinafter, heat and pressure are applied to the anisotropic conductive film, but other methods may be also available for the anisotropic conductive film to partially have conductivity. The methods may include applying only either one of heat and pressure thereto, UV curing, and the like.

Furthermore, the anisotropic conductive medium may be conductive balls or particles. According to the drawing, in this example, the anisotropic conductive film is a film with a form in which an anisotropic conductive medium is mixed with an insulating base member, and thus when heat and pressure are applied thereto, only a specific portion thereof may have conductivity by means of the conductive balls. The anisotropic conductive film may be in a state in which a core with a conductive material contains a plurality of particles coated by an insulating layer with a polymer material, and in this case, it may have conductivity by means of the core while breaking an insulating layer on a portion to which heat and pressure are applied. Here, a core may be transformed to implement a layer having both surfaces to which objects contact in the thickness direction of the film. For a more specific example, heat and pressure are applied to an anisotropic conductive film as a whole, and electrical connection in the z-axis direction is partially formed by a height difference from a mating object adhered by the use of the anisotropic conductive film.

For another example, an anisotropic conductive film may be in a state containing a plurality of particles in which a conductive material is coated on insulating cores. In this case, a portion to which heat and pressure are applied may be converted (pressed and adhered) to a conductive material to have conductivity in the thickness direction of the film. For still another example, it may be formed to have conductivity in the thickness direction of the film in which a conductive material passes through an insulating base member in the z-direction. In this case, the conductive material may have a pointed end portion.

According to the drawing, the anisotropic conductive film may be a fixed array anisotropic conductive film (ACF) configured with a form in which conductive balls are inserted into one surface of the insulating base member. More specifically, the insulating base member is formed of an adhesive material, and the conductive balls are intensively disposed at a bottom portion of the insulating base member, and when heat and pressure are applied thereto, the base member is modified along with the conductive balls, thereby having conductivity in the vertical direction thereof.

However, the present disclosure may not be necessarily limited to this, and the anisotropic conductive film may be all allowed to have a form in which conductive balls are randomly mixed with an insulating base member or a form configured with a plurality of layers in which conductive balls are disposed at any one layer (double-ACF), and the like.

The anisotropic conductive paste as a form coupled to a paste and conductive balls may be a paste in which conductive balls are mixed with an insulating and adhesive base material. Furthermore, a solution containing conductive particles may be a solution in a form containing conductive particles or nano particles.

Referring again to the drawing, the second electrode 140 is located at the insulating layer 160 to be separated from the auxiliary electrode 170. In other words, the conductive adhesive layer 130 is disposed on the insulating layer 160 located with the auxiliary electrode 170 and second electrode 140.

When the conductive adhesive layer 130 is formed in a state that the auxiliary electrode 170 and second electrode 140 are located, and then the semiconductor light-emitting element 150 is connect thereto in a flip chip form with the application of heat and pressure, the semiconductor light-emitting element 150 is electrically connected to the first electrode 120 and second electrode 140.

Referring to FIG. 4, the semiconductor light-emitting element may be a flip chip type semiconductor light-emitting element.

For example, the semiconductor light-emitting element may include a p-type electrode 156, a p-type semiconductor layer 155 formed with the p-type electrode 156, an active layer 154 formed on the p-type semiconductor layer 155, an n-type semiconductor layer 153 formed on the active layer 154, and an n-type electrode 152 disposed to be separated from the p-type electrode 156 in the horizontal direction on the n-type semiconductor layer 153. In this case, the p-type electrode 156 may be electrically connected to the welding portion 179 by the conductive adhesive layer 130, and the n-type electrode 152 may be electrically connected to the second electrode 140.

Referring to FIGS. 2, 3A and 3B again, the auxiliary electrode 170 may be formed in an elongated manner in one direction to be electrically connected to a plurality of semiconductor light-emitting elements 150. For example, the left and right p-type electrodes of the semiconductor light-emitting elements around the auxiliary electrode may be electrically connected to one auxiliary electrode.

More specifically, the semiconductor light-emitting element 150 is pressed into the conductive adhesive layer 130, and through this, only a portion between the p-type electrode 156 and auxiliary electrode 170 of the semiconductor light-emitting element 150 and a portion between the n-type electrode 152 and second electrode 140 of the semiconductor light-emitting element 150 have conductivity, and the remaining portion does not have conductivity since there is no push-down of the semiconductor light-emitting element. As described above, the conductive adhesive layer 130 may form an electrical connection as well as allow a mutual coupling between the semiconductor light-emitting element 150 and the auxiliary electrode 170 and between the semiconductor light-emitting element 150 and the second electrode 140.

Furthermore, a plurality of semiconductor light-emitting elements 150 constitute a light-emitting array, and a phosphor layer 180 is formed on the light-emitting array.

The light-emitting element array may include a plurality of semiconductor light-emitting elements with different self-luminance values. Each of the semiconductor light-emitting elements 150 constitutes a sub-pixel, and is electrically connected to the first electrode 120. For example, there may exist a plurality of first electrodes 120, and the semiconductor light-emitting elements are arranged in several rows, for instance, and each row of the semiconductor light-emitting elements may be electrically connected to any one of the plurality of first electrodes.

Furthermore, the semiconductor light-emitting elements may be connected in a flip chip form, and thus semiconductor light-emitting elements grown on a transparent dielectric substrate. Furthermore, the semiconductor light-emitting elements may be nitride semiconductor light-emitting elements, for instance. The semiconductor light-emitting element 150 has an excellent luminance characteristic, and thus it may be possible to configure individual sub-pixels even with a small size thereof.

According to the drawing, a partition wall 190 may be formed between the semiconductor light-emitting elements 150. In this case, the partition wall 190 may perform the role of dividing individual sub-pixels from one another, and be formed as an integral body with the conductive adhesive layer 130. For example, a base member of the anisotropic conductive film may form the partition wall when the semiconductor light-emitting element 150 is inserted into the anisotropic conductive film.

Furthermore, when the base member of the anisotropic conductive film is black, the partition wall 190 may have reflective characteristics while at the same time increasing contrast with no additional black insulator.

For another example, a reflective partition wall may be separately provided with the partition wall 190. In this case, the partition wall 190 may include a black or white insulator according to the purpose of the display device. When a partition wall of a white insulator is used, an effect of enhancing reflectivity may be obtained. When a partition wall of a black insulator is used, a contrast ratio may be increased while having a reflection characteristic.

The phosphor layer 180 may be located at an outer surface of the semiconductor light-emitting element 150. For example, the semiconductor light-emitting element 150 is a blue semiconductor light-emitting element that emits blue (B) light, and the phosphor layer 180 performs the role of converting the blue (B) light into the color of a sub-pixel. The phosphor layer 180 may be a red phosphor layer 181 or green phosphor layer 182 constituting individual pixels.

In other words, a red phosphor 181 capable of converting blue light into red (R) light may be deposited on the blue semiconductor light-emitting element 151 at a location implementing a red sub-pixel, and a green phosphor 182 capable of converting blue light into green (G) light may be deposited on the blue semiconductor light-emitting element 151 at a location implementing a green sub-pixel. Furthermore, only the blue semiconductor light-emitting element 151 may be solely used at a location implementing a blue sub-pixel. In this case, the red (R), green (G) and blue (B) sub-pixels may implement one pixel. More specifically, one color phosphor may be deposited along each line of the first electrode 120. Accordingly, one line on the first electrode 120 may be an electrode controlling one color. In other words, red (R), green (B) and blue (B) may be sequentially disposed along the second electrode 140, thereby implementing sub-pixels.

However, the present disclosure may not be necessarily limited to this, and the semiconductor light-emitting element 150 may be combined with a quantum dot (QD) instead of a phosphor to implement sub-pixels such as red (R), green (G) and blue (B).

Furthermore, a black matrix 191 may be disposed between each phosphor layer to enhance contrast. In other words, the black matrix 191 can enhance the contrast of luminance.

However, the present disclosure may not be necessarily limited to this, and another structure for implementing blue, red and green may be also applicable thereto.

Figure 5A:
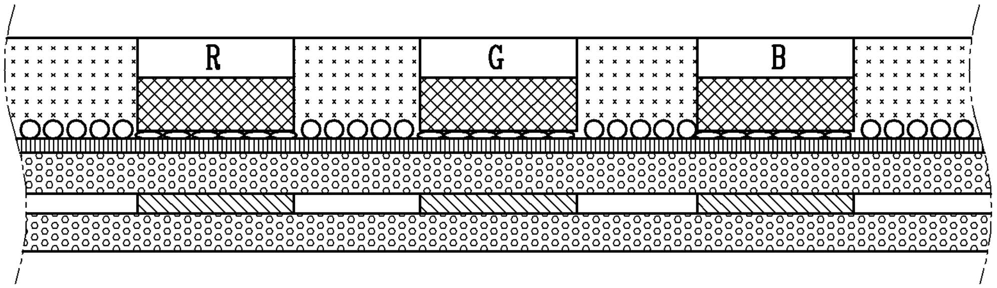
FIGS. 5A through 5C are conceptual views illustrating various forms for implementing colors in connection with a flip-chip type semiconductor light-emitting element.

Referring to FIG. 5A, each of the semiconductor light-emitting elements 150 may be implemented with a high-power light-emitting element that emits various lights including blue in which gallium nitride (GaN) is mostly used, and indium (In) and or aluminum (Al) are added thereto.

In this case, the semiconductor light-emitting element 150 may be red, green and blue semiconductor light-emitting elements, respectively, to implement each sub-pixel. For instance, red, green and blue semiconductor light-emitting elements (R, G, B) are alternately disposed, and red, green and blue sub-pixels implement one pixel by means of the red, green and blue semiconductor light-emitting elements, thereby implementing a full color display.

Figure 5B:
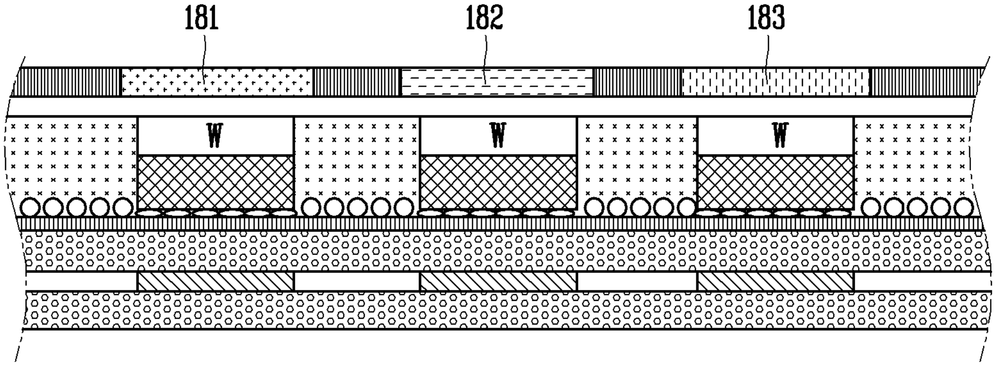

Referring to FIG. 5B, the semiconductor light-emitting element may have a white light-emitting element (W) provided with a yellow phosphor layer for each element. In this case, a red phosphor layer 181, a green phosphor layer 182 and blue phosphor layer 183 may be provided on the white light-emitting element (W) to implement a sub-pixel. Furthermore, a color filter repeated with red, green and blue on the white light-emitting element (W) may be used to implement a sub-pixel.

Figure 5C:
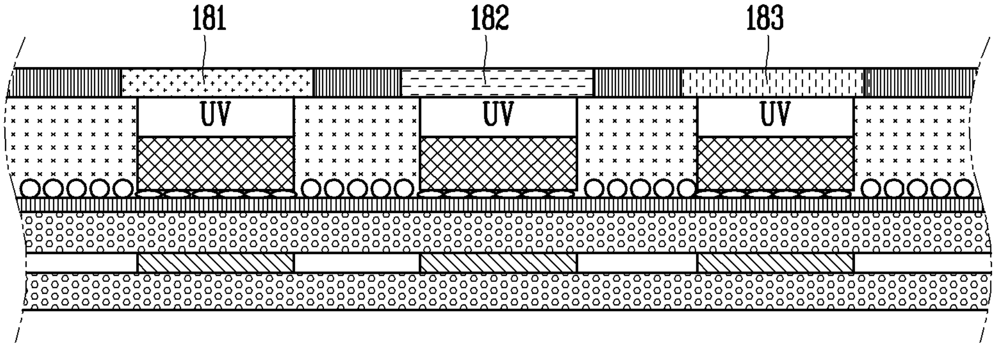

Referring to FIG. 5C, it may be possible to also have a structure in which a red phosphor layer 181, a green phosphor layer 182 and blue phosphor layer 183 may be provided on a ultra violet light-emitting element (UV). In this manner, the semiconductor light-emitting element can be used over the entire region up to ultra violet (UV) as well as visible light, and may be extended to a form of semiconductor light-emitting element in which ultra violet (UV) can be used as an excitation source.

Taking the present example into consideration again, the semiconductor light-emitting element 150 is placed on the conductive adhesive layer 130 to configure a sub-pixel in the display device. The semiconductor light-emitting element 150 has an excellent luminance characteristic, and thus it may be possible to configure individual sub-pixels even with a small size thereof. A size of an individual semiconductor light-emitting element 150 may have a side length of 80 μm or less, and may be a rectangular or square device. In case of a rectangular shaped element, the size thereof may be less than 20×80 μm.

Furthermore, even when a square shaped semiconductor light-emitting element 150 with a length of side of 10 μm is used for a sub-pixel, it will exhibit a sufficient brightness for implementing a display device. Accordingly, for example, in case of a rectangular pixel in which one side of a sub-pixel is 600 μm in size, and the remaining one side thereof is 300 μm, a relative distance between the semiconductor light-emitting elements becomes sufficiently large. Accordingly, in this case, it may be possible to implement a flexible display device having a HD image quality.

A display device using the foregoing semiconductor light-emitting element will be fabricated by a new type of fabrication method. Hereinafter, the manufacturing method will be described with reference to FIG. 6.

Figure 6:
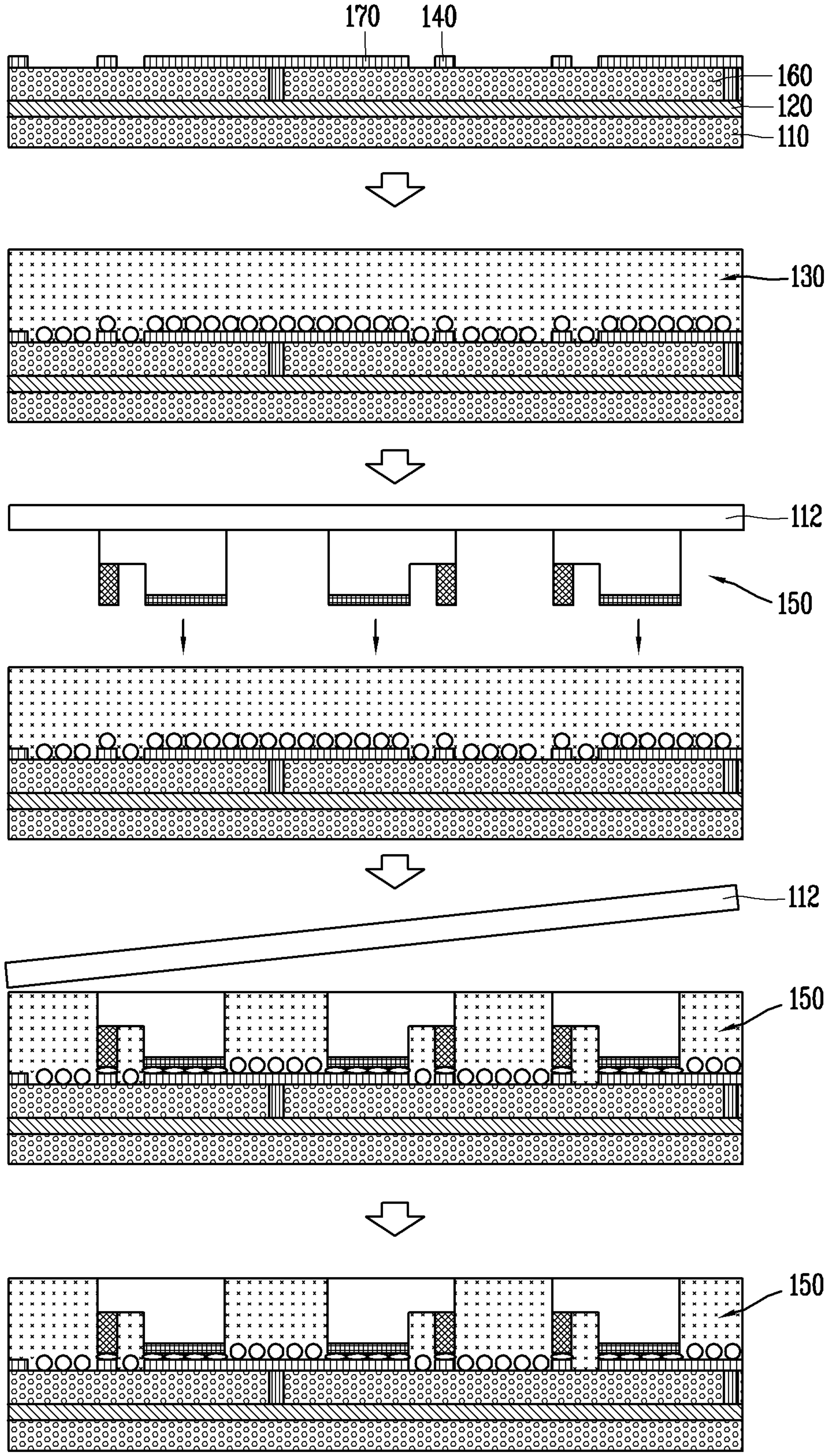
FIG. 6 is cross-sectional views illustrating a fabrication method of a display device using a semiconductor light-emitting element according to the present disclosure.

FIG. 6 is cross-sectional views illustrating a fabrication method of a display device using a semiconductor light-emitting element according to the present disclosure.

Referring to the drawing, first, the conductive adhesive layer 130 is formed on the insulating layer 160 located with the auxiliary electrode 170 and second electrode 140. The insulating layer 160 is deposited on the first substrate 110 to form one substrate (or wiring substrate), and the first electrode 120, auxiliary electrode 170 and second electrode 140 are disposed at the wiring substrate. In this case, the first electrode 120 and second electrode 140 may be disposed in a perpendicular direction to each other. Furthermore, the first substrate 110 and insulating layer 160 may contain glass or polyimide (PI), respectively, to implement a flexible display device.

The conductive adhesive layer 130 may be implemented by an anisotropic conductive film, for example, and to this end, an anisotropic conductive film may be coated on a substrate located with the insulating layer 160.

Next, a second substrate 112 located with a plurality of semiconductor light-emitting elements 150 corresponding to the location of the auxiliary electrodes 170 and second electrodes 140 and constituting individual pixels is disposed such that the semiconductor light-emitting element 150 faces the auxiliary electrode 170 and second electrode 140.

In this case, the second substrate 112 as a growth substrate for growing the semiconductor light-emitting element 150 may be a sapphire substrate or silicon substrate.

The semiconductor light-emitting element may have a gap and size capable of implementing a display device when formed in the unit of wafer, and thus effectively used for a display device.

Next, the wiring substrate is thermally compressed to the second substrate 112. For example, the wiring substrate and second substrate 112 may be thermally compressed to each other by applying an ACF press head. The wiring substrate and second substrate 112 are bonded to each other using the thermal compression. Only a portion between the semiconductor light-emitting element 150 and the auxiliary electrode 170 and second electrode 140 may have conductivity due to the characteristics of an anisotropic conductive film having conductivity by thermal compression, thereby allowing the electrodes and semiconductor light-emitting element 150 to be electrically connected to each other. At this time, the semiconductor light-emitting element 150 may be inserted into the anisotropic conductive film, thereby forming a partition wall between the semiconductor light-emitting elements 150.

Next, the second substrate 112 is removed. For example, the second substrate 112 may be removed using a laser lift-off (LLO) or chemical lift-off (CLO) method.

Finally, the second substrate 112 is removed to expose the semiconductor light-emitting elements 150 to the outside. Silicon oxide (SiOx) or the like may be coated on the wiring substrate coupled to the semiconductor light-emitting element 150 to form a transparent insulating layer (not shown).

Furthermore, it may further include the process of forming a phosphor layer on one surface of the semiconductor light-emitting element 150. For example, the semiconductor light-emitting element 150 may be a blue semiconductor light-emitting element for emitting blue (B) light, and red or green phosphor for converting the blue (B) light into the color of the sub-pixel may form a layer on one surface of the blue semiconductor light-emitting element.

The fabrication method or structure of a display device using the foregoing semiconductor light-emitting element may be modified in various forms. For such an example, the foregoing display device may be applicable to a vertical semiconductor light-emitting element. Hereinafter, the vertical structure will be described with reference to FIGS. 5 and 6.

Furthermore, according to the following modified example or embodiment, the same or similar reference numerals are designated to the same or similar configurations to the foregoing example, and the description thereof will be substituted by the earlier description.

Figure 7:
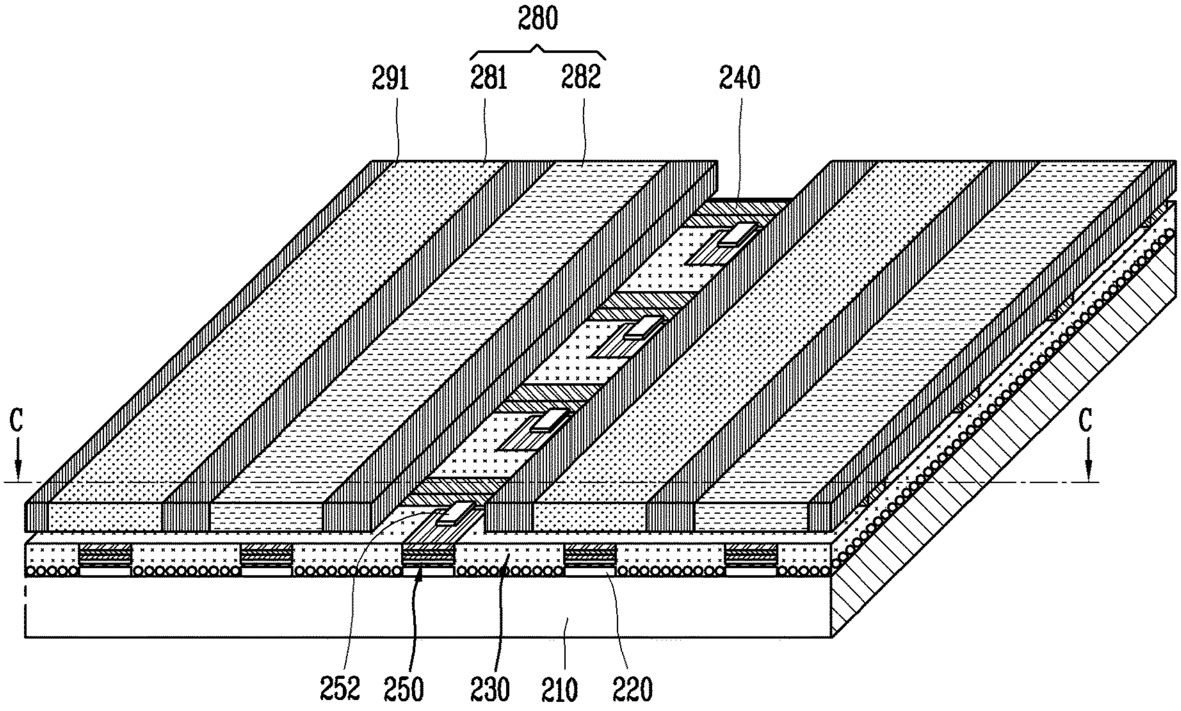
FIG. 7 is a perspective view illustrating a display device using a semiconductor light-emitting element according to another embodiment of the present disclosure.
Figure 8:
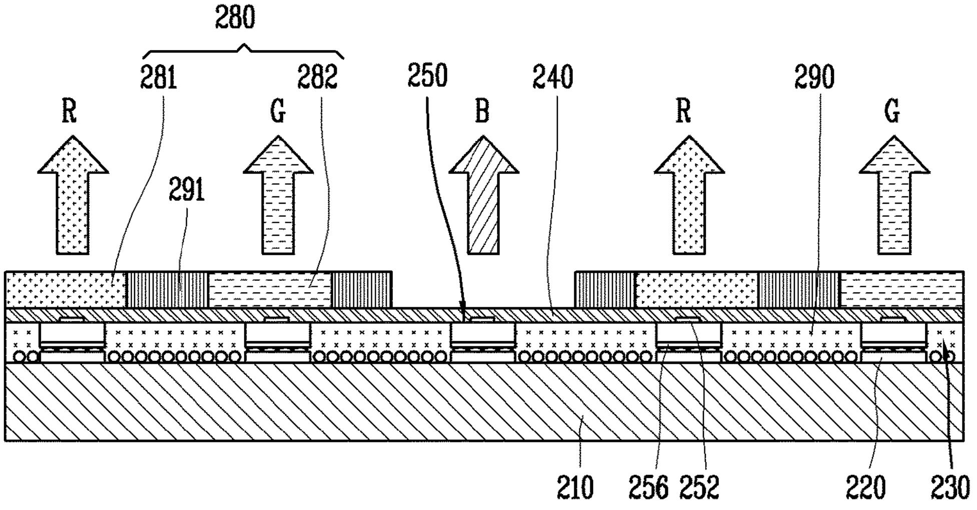
FIG. 8 is a cross-sectional view taken along line D-D in FIG. 7.
Figure 9:
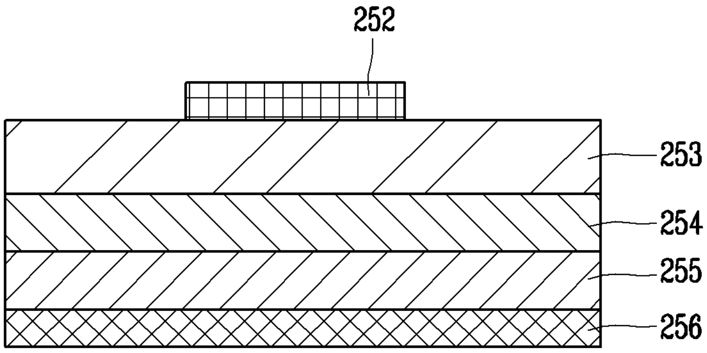
FIG. 9 is a conceptual view showing a vertical semiconductor light-emitting element in FIG. 8.

FIG. 7 is a perspective view illustrating a display device using a semiconductor light-emitting element according to another embodiment of the present disclosure. FIG. 8 is a cross-sectional view taken along line C-C in FIG. 7, and FIG. 9 is a conceptual view illustrating a vertical type semiconductor light-emitting element in FIG. 8.

According to the drawings, the display device may be display device using a passive matrix (PM) type of vertical semiconductor light-emitting element.

The display device may include a substrate 210, a first electrode 220, a conductive adhesive layer 230, a second electrode 240 and a plurality of semiconductor light-emitting elements 250.

The substrate 210 as a wiring substrate disposed with the first electrode 220 may include polyimide (PI) to implement a flexible display device. In addition, any one may be used if it is an insulating and flexible material.

The first electrode 220 may be located on the substrate 210, and formed with a bar-shaped electrode elongated in one direction. The first electrode 220 may be formed to perform the role of a data electrode.

The conductive adhesive layer 230 is formed on the substrate 210 located with the first electrode 220. Similar to a display device to which a flip chip type light-emitting element is applied, the conductive adhesive layer 230 may be an anisotropic conductive film (ACF), an anisotropic conductive paste, a solution containing conductive particles, and the like. However, the present embodiment illustrates a case where the conductive adhesive layer 230 is implemented by an anisotropic conductive film.

When an anisotropic conductive film is located in a state that the first electrode 220 is located on the substrate 210, and then heat and pressure are applied to connect the semiconductor light-emitting element 250 thereto, the semiconductor light-emitting element 250 is electrically connected to the first electrode 220. At this time, the semiconductor light-emitting element 250 may be preferably disposed on the first electrode 220.

The electrical connection is generated because an anisotropic conductive film partially has conductivity in the thickness direction when heat and pressure are applied as described above. Accordingly, the anisotropic conductive film is partitioned into a portion 231 having conductivity and a portion 232 having no conductivity in the thickness direction thereof.

Furthermore, the anisotropic conductive film contains an adhesive component, and thus the conductive adhesive layer 230 implements a mechanical coupling as well as an electrical coupling between the semiconductor light-emitting element 250 and the first electrode 220.

As such, the semiconductor light-emitting element 250 is positioned on the conductive adhesive layer 230, thereby constituting an individual pixel in the display device. The semiconductor light-emitting element 250 has an excellent luminance characteristic, and thus it may be possible to configure individual sub-pixels even with a small size thereof. A size of an individual semiconductor light-emitting element 250 may have a side length of 80 μm or less, and may be a rectangular or square device. In case of a rectangular shaped element, the size thereof may be less than 20×80 μm.

The semiconductor light-emitting element 250 may be a vertical structure.

A plurality of second electrodes 240 disposed in a direction of crossing the length direction of the first electrode 220, and electrically connected to the vertical semiconductor light-emitting element 250 may be located between vertical semiconductor light-emitting elements.

Referring to FIG. 9, the vertical semiconductor light-emitting element may include a p-type electrode 256, a p-type semiconductor layer 255 formed with the p-type electrode 256, an active layer 254 formed on the p-type semiconductor layer 255, an n-type semiconductor layer 253 formed on the active layer 254, and an n-type electrode 252 formed on the n-type semiconductor layer 253. In this case, the p-type electrode 256 located at the bottom thereof may be electrically connected to the first electrode 220 by the conductive adhesive layer 230, and the n-type electrode 252 located at the top thereof may be electrically connected to the second electrode 240 which will be described later. The electrodes may be disposed in the upward/downward direction in the vertical semiconductor light-emitting element 250, thereby providing a great advantage capable of reducing the chip size.

Referring again to FIG. 8, a phosphor layer 280 may be formed on one surface of the semiconductor light-emitting element 250. For example, the semiconductor light-emitting element 250 is a blue semiconductor light-emitting element 251 that emits blue (B) light, and the phosphor layer 280 for converting the blue (B) light into the color of the sub-pixel may be provided thereon. In this case, the phosphor layer 280 may be a red phosphor 281 and a green phosphor 282 constituting individual pixels.

In other words, a red phosphor 281 capable of converting blue light into red (R) light may be deposited on the blue semiconductor light-emitting element 251 at a location implementing a red sub-pixel, and a green phosphor 282 capable of converting blue light into green (G) light may be deposited on the blue semiconductor light-emitting element 251 at a location implementing a green sub-pixel. Furthermore, only the blue semiconductor light-emitting element 251 may be solely used at a location implementing a blue sub-pixel. In this case, the red (R), green (G) and blue (B) sub-pixels may implement one pixel.

However, the present disclosure may not be necessarily limited to this, and another structure for implementing blue, red and green may be also applicable thereto as described above in a display device to which a flip chip type light-emitting element is applied.

Taking the present embodiment into consideration again, the second electrode 240 is located between the semiconductor light-emitting elements 250, and electrically connected to the semiconductor light-emitting elements 250. For example, the semiconductor light-emitting elements 250 may be disposed in a plurality of rows, and the second electrode 240 may be located between the rows of the semiconductor light-emitting elements 250.

Since a distance between the semiconductor light-emitting elements 250 constituting individual pixels is sufficiently large, the second electrode 240 may be located between the semiconductor light-emitting elements 250.

The second electrode 240 may be formed with a bar-shaped electrode elongated in one direction, and disposed in a perpendicular direction to the first electrode.

Furthermore, the second electrode 240 may be electrically connected to the semiconductor light-emitting element 250 by a connecting electrode protruded from the second electrode 240. More specifically, the connecting electrode may be an n-type electrode of the semiconductor light-emitting element 250. For example, the n-type electrode is formed with an ohmic electrode for ohmic contact, and the second electrode covers at least a portion of the ohmic electrode by printing or deposition. Through this, the second electrode 240 may be electrically connected to the n-type electrode of the semiconductor light-emitting element 250.

According to the drawing, the second electrode 240 may be located on the conductive adhesive layer 230. According to circumstances, a transparent insulating layer (not shown) containing silicon oxide (SiOx) may be formed on the substrate 210 formed with the semiconductor light-emitting element 250. When the transparent insulating layer is formed and then the second electrode 240 is placed thereon, the second electrode 240 may be located on the transparent insulating layer. Furthermore, the second electrode 240 may be formed to be separated from the conductive adhesive layer 230 or transparent insulating layer.

If a transparent electrode such as indium tin oxide (ITO) is used to locate the second electrode 240 on the semiconductor light-emitting element 250, the ITO material has a problem of bad adhesiveness with an n-type semiconductor. Accordingly, the second electrode 240 may be placed between the semiconductor light-emitting elements 250, thereby obtaining an advantage in which the transparent electrode is not required. Accordingly, an n-type semiconductor layer and a conductive material having a good adhesiveness may be used as a horizontal electrode without being restricted by the selection of a transparent material, thereby enhancing the light extraction efficiency.

According to the drawing, a partition wall 290 may be formed between the semiconductor light-emitting elements 250. In other words, the partition wall 290 may be disposed between the vertical semiconductor light-emitting elements 250 to isolate the semiconductor light-emitting element 250 constituting individual pixels. In this case, the partition wall 290 may perform the role of dividing individual sub-pixels from one another, and be formed as an integral body with the conductive adhesive layer 230. For example, a base member of the anisotropic conductive film may form the partition wall when the semiconductor light-emitting element 250 is inserted into the anisotropic conductive film.

Furthermore, when the base member of the anisotropic conductive film is black, the partition wall 290 may have reflective characteristics while at the same time increasing contrast with no additional black insulator.

For another example, a reflective partition wall may be separately provided with the partition wall 290. The partition wall 290 may include a black or white insulator according to the purpose of the display device.

If the second electrode 240 is precisely located on the conductive adhesive layer 230 between the semiconductor light-emitting elements 250, the partition wall 290 may be located between the vertical semiconductor light-emitting elements 250 and the second electrodes 240. Accordingly, individual sub-pixels may be configured even with a small size using the semiconductor light-emitting element 250, and a distance between the semiconductor light-emitting elements 250 may be relatively sufficiently large to place the second electrode 240 between the semiconductor light-emitting elements 250, thereby having the effect of implementing a flexible display device having a HD image quality.

Furthermore, according to the drawing, a black matrix 291 may be disposed between each phosphor layer to enhance contrast. In other words, the black matrix 291 may enhance the contrast of luminance.

In this manner, the semiconductor light-emitting element 250 is placed on the conductive adhesive layer 230, thereby configuring a separate sub-pixel in the display device. The semiconductor light-emitting element 250 has an excellent luminance characteristic, and thus it may be possible to configure individual sub-pixels even with a small size thereof. As a result, it may be possible to implement a full color display in which the sub-pixels of red (R), green (G) and blue (B) implement one pixel by means of the semiconductor light-emitting element.

Meanwhile, the present disclosure implements an active-matrix display device using flip-flops. Furthermore, the present disclosure presents an image processing method of time-dividing one frame into a plurality of sub-fields in the implementation of a display device using flip-flops to control the contrast of a semiconductor light-emitting element.

Figure 10:
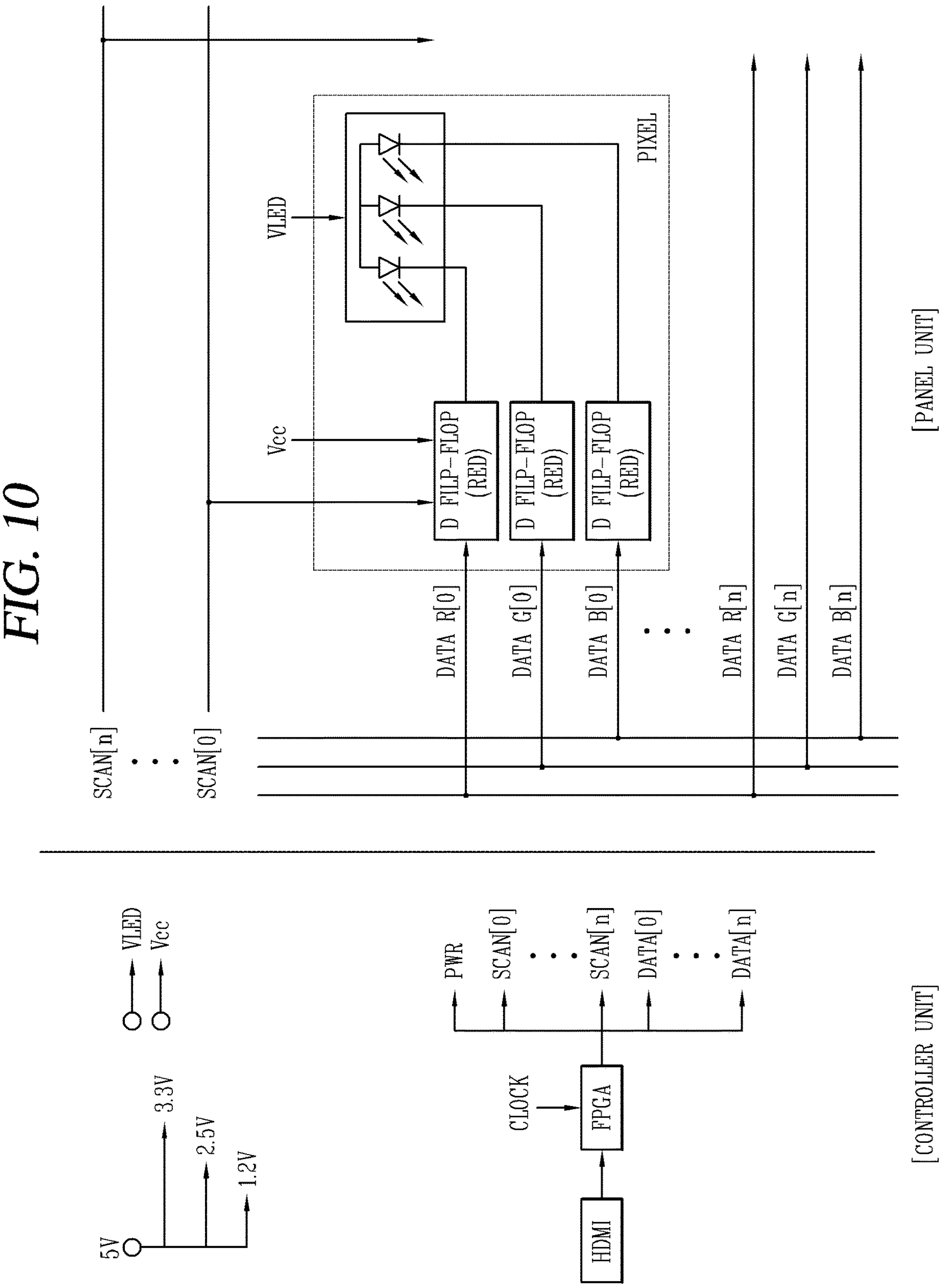
FIG. 10 schematically shows a circuit diagram of a display device according to the present disclosure.
Figure 11:
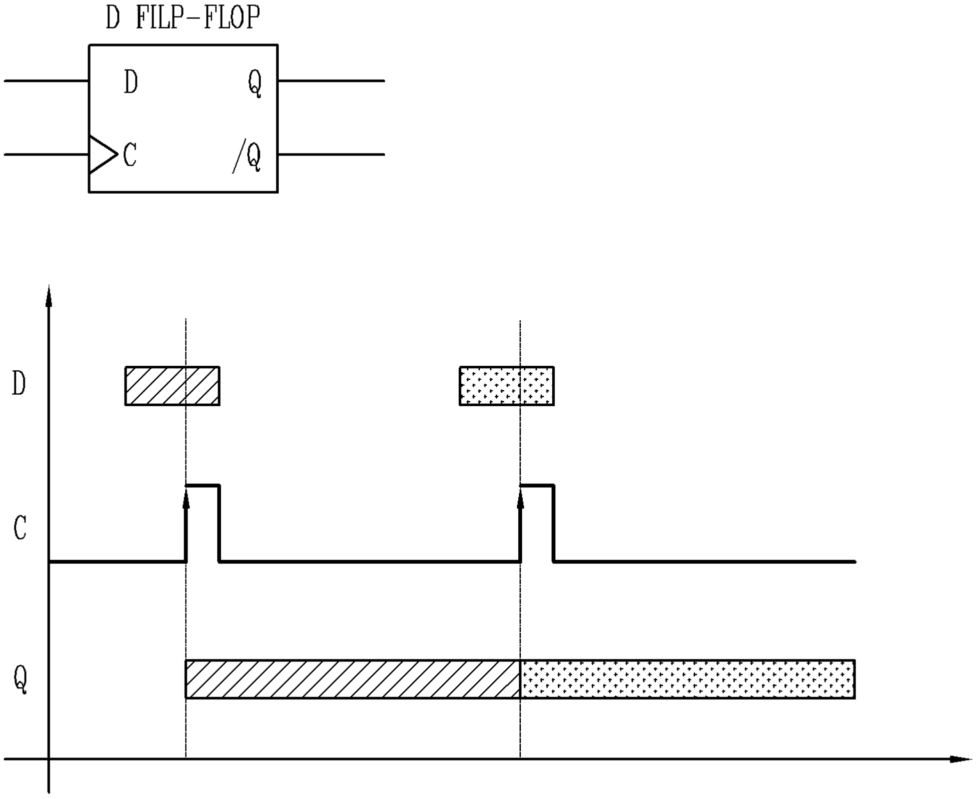
FIG. 11 is a conceptual view showing a structure of a D flip-flop and a driving signal.
Figure 12:
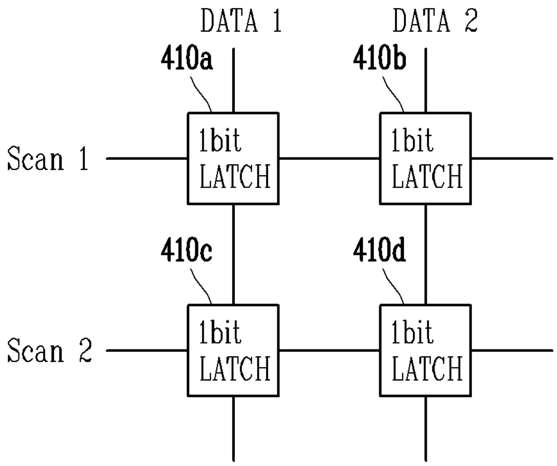
FIGS. 12 and 13 are conceptual views showing a display device implemented with four flip-flops.
Figure 13:
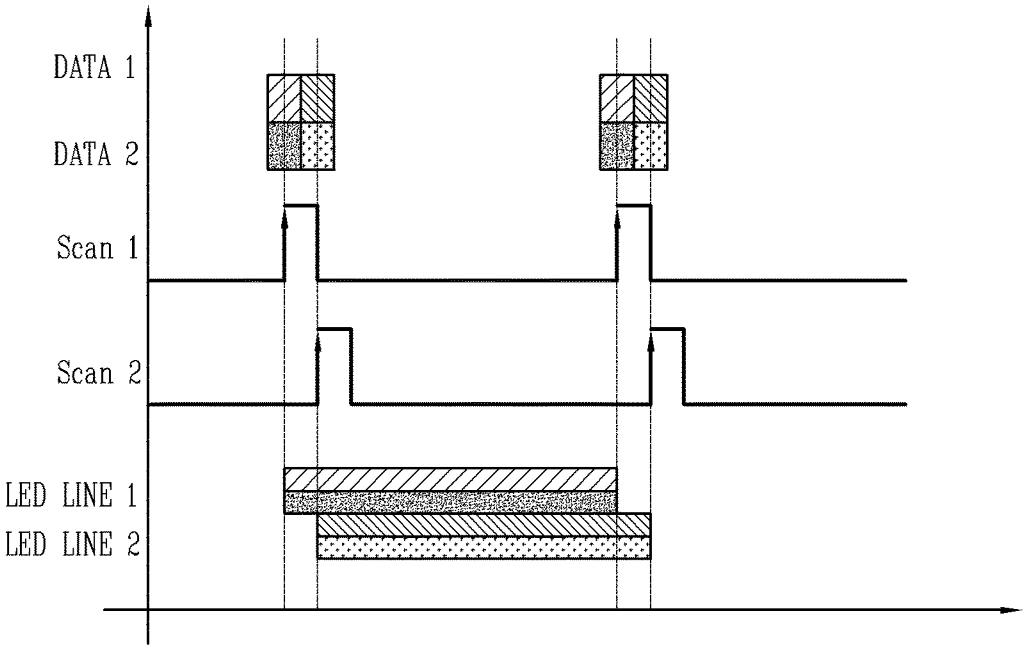

FIG. 10 schematically shows a circuit diagram of a display device according to the present disclosure, FIG. 11 is a conceptual view showing a structure of a D flip-flop and a driving signal, and FIGS. 12 and 13 are conceptual views showing a display device implemented with four flip-flops.

Referring to FIG. 10, a display device according to the present disclosure includes a substrate, a plurality of semiconductor light-emitting elements, a plurality of flip-flops, a plurality of scan electrodes, and data electrodes, and includes a drive unit that controls the light emission of the semiconductor light-emitting elements.

The substrate and the semiconductor light-emitting element are the same as those described with reference to FIGS. 1 to 9, and thus a detailed description thereof will be omitted.

Meanwhile, the flip-flop applies an electric signal to the semiconductor light-emitting element so that the semiconductor light-emitting element maintains a light-emitting state for a predetermined time period. In an embodiment, the flip-flop may include a data input unit, a clock input unit, and at least one output unit. In an embodiment, the flip-flop may be a D-flip-flop.

One scan electrode and one data electrode are connected to one flip-flop. Specifically, the scan electrode is connected to the clock input unit of the flip-flop, and the data electrode is connected to the data input unit.

A semiconductor light-emitting element is connected to the output unit of the flip-flop, and whether the semiconductor light-emitting element emits light is determined according to an electric signal output from the output unit of the flip-flop. Since an electrical signal output from the flip-flop is maintained until a new electrical signal is applied to the clock input unit, when it is determined whether the semiconductor light-emitting element emits light, the semiconductor light-emitting element maintains a light-emitting state or a non-light-emitting state for a predetermined time period.

Specifically, an output signal according to a signal applied to the flip-flop will be described in detail with reference to FIG. 11.

Referring to FIG. 11, when a clock input C is activated, a signal applied to a data input unit D is transmitted to an output unit Q. The timing at which the signal applied to the data input unit is transmitted to the output unit may be immediately after the clock input is activated or when the clock input is deactivated. This is not specifically limited. By utilizing the characteristics of the flip-flop, the same signal may be applied for a predetermined time period.

An embodiment of controlling light emission of four semiconductor light-emitting elements through four flip-flops will be described with reference to FIGS. 12 and 13.

Referring to FIG. 12, two scan electrodes are disposed in parallel with each other, and two data electrodes are disposed in parallel with each other in a direction crossing the scan electrodes. A flip-flop and a semiconductor light-emitting element are disposed at a position where the scan electrode and the data electrode cross each other.

A scan signal is applied to each scan electrode at a predetermined period, and the scan signal is transmitted to a clock input unit of a flip-flop connected to the scan electrode. The scan signals are sequentially applied to the scan electrodes arranged in parallel with each other. The scan signal is applied to all the scan electrodes, and then after a predetermined time period passes, the scan signal is sequentially applied to the scan electrodes again. As a result, a scan signal is applied to one scan electrode at a predetermined period, and the scan signal is applied to different scan electrodes with a predetermined time difference.

Meanwhile, a data signal is applied to the data electrode at a predetermined timing. The data signal may be a signal corresponding to 0 or 1. The data signal has a predetermined effective range. The data signal may be transmitted to the output unit of the flip-flop only when an edge of a clock signal is positioned within an effective range of the data signal.

The effective range is within a predetermined time period from a time point at which the data signal is applied to the data electrode, and the effective range must not exceed a pulse wide of the scan signal. When the effective range exceeds the pulse width of the scan signal, the data signal may be synchronized with an undesired scan signal and output to an output unit of an undesired flip-flop.

Referring to FIG. 13, a scan signal is applied to a first scan electrode and a second scan electrode with a predetermined time difference. As soon as the scan signal is activated, a data signal applied to the data input unit of the flip-flop is transmitted to the output unit. Meanwhile, for synchronization with the scan signal, the data signal is applied to each of the first and second data electrodes with a predetermined time difference.

Meanwhile, the data signal synchronized with the scan signal is transmitted to the output unit of the flip-flop, and the transmitted data signal is output from the output unit of the flip-flop until the next scan signal is applied. Whether the semiconductor light-emitting element emits light is determined according to a signal output from the output unit of the flip-flop.

For example, when a semiconductor light-emitting element emits light by a data signal synchronized with a first scan signal applied to the first scan electrode, the semiconductor light-emitting element maintains a light-emitting state until a second scan signal is applied to the first scan electrode. For another example, when a semiconductor light-emitting element does not emit light by a data signal synchronized with a first scan signal applied to the second scan electrode, the semiconductor light-emitting element maintains a non-light-emitting state until a second scan signal is applied to the second scan electrode.

As described above, the flip-flop maintains a light-emitting state or a non-light-emitting state for a predetermined time period for each semiconductor light-emitting element.

Figure 14:
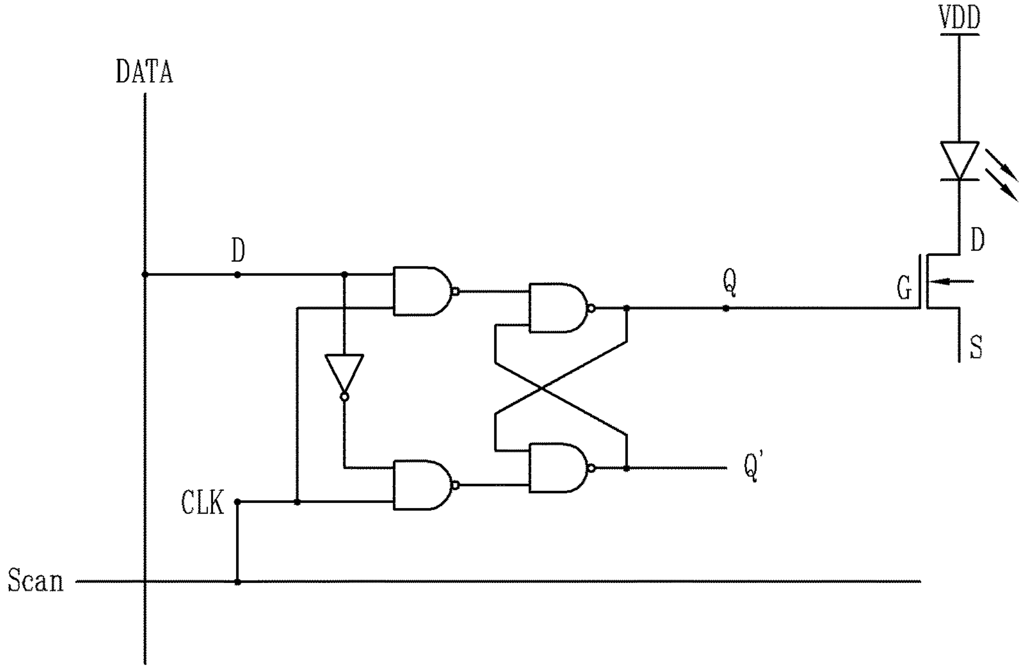
FIGS. 14 and 15 are circuit diagrams showing an embodiment of connecting a semiconductor light-emitting element and a flip-flop.
Figure 15:
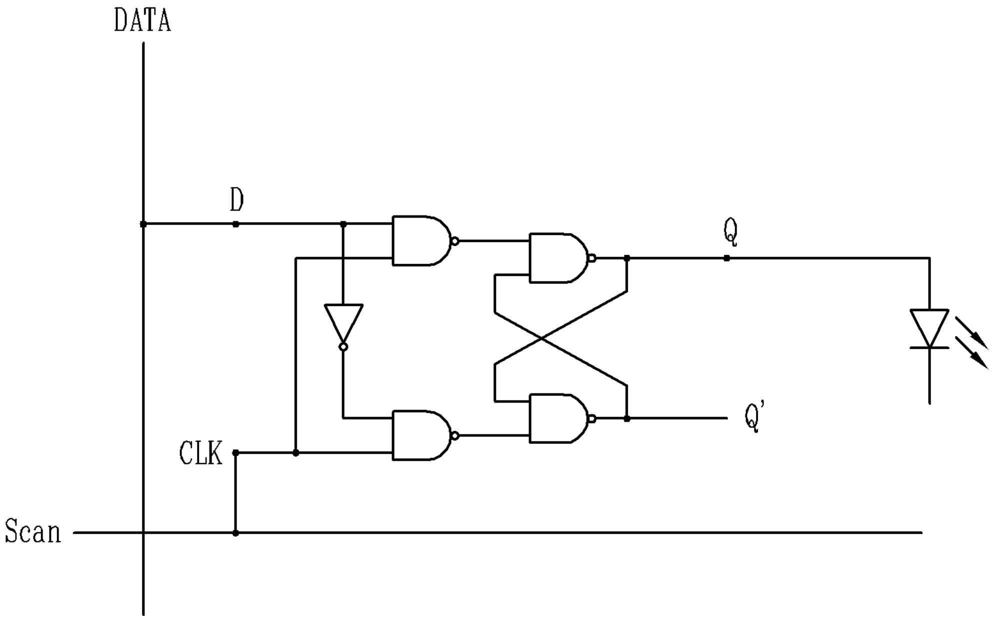

In an embodiment, as shown in FIG. 14, the output unit of the flip-flop may be connected to the semiconductor light-emitting element through a separate switch or may be directly connected to the semiconductor light-emitting element as shown in FIG. 15. However, FIGS. 14 and 15 are only examples of connecting the semiconductor light-emitting element and the flip-flop, and the present specification does not specifically limit the method of connecting the semiconductor light-emitting element and the flip-flop.

Hereinafter, a method of processing an image of one frame in a display device according to the present disclosure will be described in detail.

Figure 16:
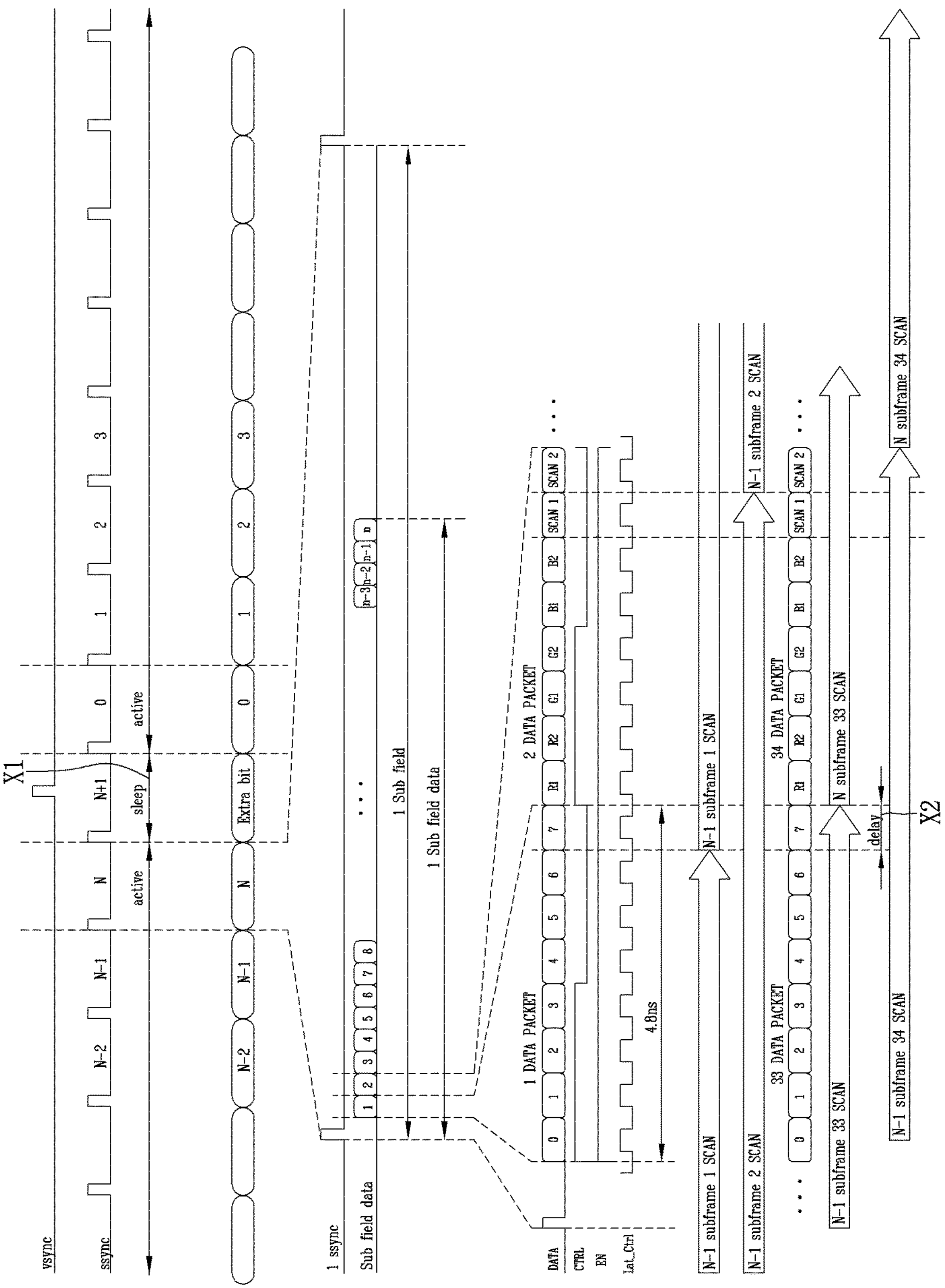
FIG. 16 is a conceptual view showing an image processing signal of a display device according to the present disclosure.

FIG. 16 is a conceptual view showing an image processing signal of a display device according to the present disclosure.

Referring to FIG. 16, a drive unit included in a display device according to the present disclosure generates a frame synchronization signal (vsync) at a predetermined time interval. Accordingly, a time period for each frame is determined from a time point at which a frame synchronization signal is generated to a time point at which a next frame synchronization signal is generated. Meanwhile, the drive unit generates a sub-field signal (ssync) separately from the frame synchronization signal.

The frame synchronization signal and the sub-field signal (ssync) are generated out of synchronization with each other. The sub-field signal (ssync) may be generated N times or N+1 times for a time period from a time point at which one frame synchronization signal is generated to a time point at which a next frame signal is generated (hereinafter, referred to as one frame time period). Describing this in detail, the sub-field signal (ssync) may be generated at a predetermined time interval, but since it is not synchronized with the frame synchronization signal, a different number of sub-field signals (ssync) may be generated within one frame time period.

Meanwhile, data corresponding to one frame is applied for a time period N times a time period from a time point at which the sub-field signal (ssync) is generated to a time point at which a next sub-field signal (ssync) is generated (hereinafter, one sub-field time period).

When the sub-field signal is generated N+1 times within one frame time period, there is no data to be applied. Accordingly, when the frame synchronization signal is generated during a time period from a time point at which a sub-field signal is generated to a time point at which a next sub-field signal is generated, the drive unit prevents a voltage from being applied to the data electrodes for the time period from the time point at which the sub-field signal is generated to the time point at which the next sub-field signal is generated. Referring to FIG. 16, the drive unit separately allocates an extra bit so as not to apply a voltage to all data electrodes during a time period X1. Accordingly, all pixels are turned off during the time period X1.

Meanwhile, all sub-field signals are generated at predetermined time intervals, and data and scan signals are applied based on the sub-field signals. Specifically, a total of n data packets are applied for one sub-field time period.

According to an embodiment, one data packet may be divided into a total of 8 blocks. Each block may consist of 32 bits. The eight blocks include two blocks R1 and R2 related to red semiconductor light-emitting elements, two blocks G1 and G2 related to green semiconductor light-emitting elements, two blocks B1 and B2 related to blue semiconductor light-emitting elements, and two blocks SCAN1 and SCAN2 related to scan lines.

Each of the blocks related to the red, green, and blue semiconductor light-emitting elements includes information related to data lines to which a voltage is to be applied, and includes information related to scan lines to which a voltage is to be applied. The drive unit applies a voltage to the scan lines and the data lines using the data packet.

In an embodiment, the drive unit applies a voltage to scan lines using two blocks SCAN1 and SCAN2 related to the scan lines included in any one data packet. For example, each of the two blocks SCAN1 and SCAN2 related to the scan lines consists of 32 bits, and each bit indicates whether a voltage is applied to the scan lines. A total of 32 scan lines can be controlled by using a block of 32 bits related to scan lines. In addition, in a case where two blocks are used, a total of 64 scan lines can be controlled.

Meanwhile, the drive unit applies a voltage to data lines using R1, R2, G1, G2, B1, and B2. As shown in FIG. 16, in a case where two blocks SCAN1 and SCAN2 related to scan lines are disposed at an end portion of a data packet, a voltage is applied to a specific scan electrode in a state in which a voltage is applied to a data line by blocks R1, R2, G1, G2, B1, and B2. Accordingly, the semiconductor light-emitting element indicated by the data packet is turned on. At this time, the drive unit may apply a voltage to a scan line in a state in which only one of the two blocks SCAN1 and SCAN2 related to scan lines is applied, or apply a voltage to a scan line in a state in which both blocks are applied.

When a voltage application signal is included in the first applied block SCAN1 between the two blocks SCAN1 and SCAN2 related to scan lines, the semiconductor light-emitting element is turned on as SCAN1 is applied. When the voltage application signal is included in the later applied block SCAN2 between the two blocks SCAN1 and SCAN2 related to scan lines, the semiconductor light-emitting element is turned on as SCAN2 is applied. For the above reasons, a delay X2 may be generated when a next data packet is applied after a data packet including a voltage application signal for a specific scan line is applied.

For example, in a case where SCAN1 and SCAN2 each consist of 32 bits, a time interval from a time point at which a data packet including a voltage application signal for a 32nd scan line starts to be applied to a time point at which the semiconductor light-emitting element is turned on and a time interval from a time point at which a data packet including a voltage application signal for a 33rd scan line starts to be applied to a time point at which the semiconductor light-emitting element is turned on differ by a time period in which one block related to scan lines is applied. The foregoing delay is generated for every sub-field section.

Meanwhile, one sub-field time period and a time period in which one data packet is applied do not exactly match.

Figure 17:
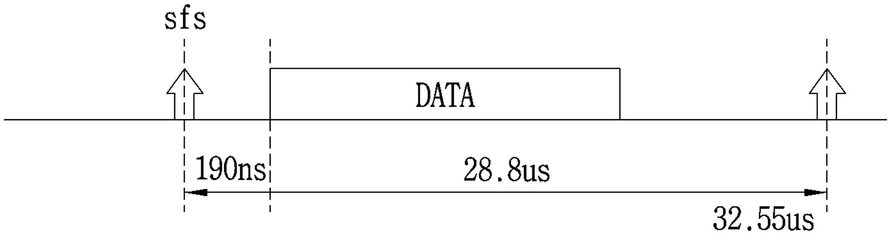
FIG. 17 is a timing diagram showing a state in which data is applied for a sub-field time period.

FIG. 17 is a timing diagram showing a state in which data is applied for one sub-field time period.

Referring to FIG. 17, a data packet is applied 190 ns after a sub-field signal (sfs) is applied. The data packet is applied for 28.8 μs. One sub-field time period is 32.55 μs. After the data packet is completely applied, a light-emitting state according to the applied data packet is maintained for the remaining one sub-field time period.

Meanwhile, the generation timing of the sub-field signal is generated out of synchronization with the frame synchronization signal.

Figure 18:
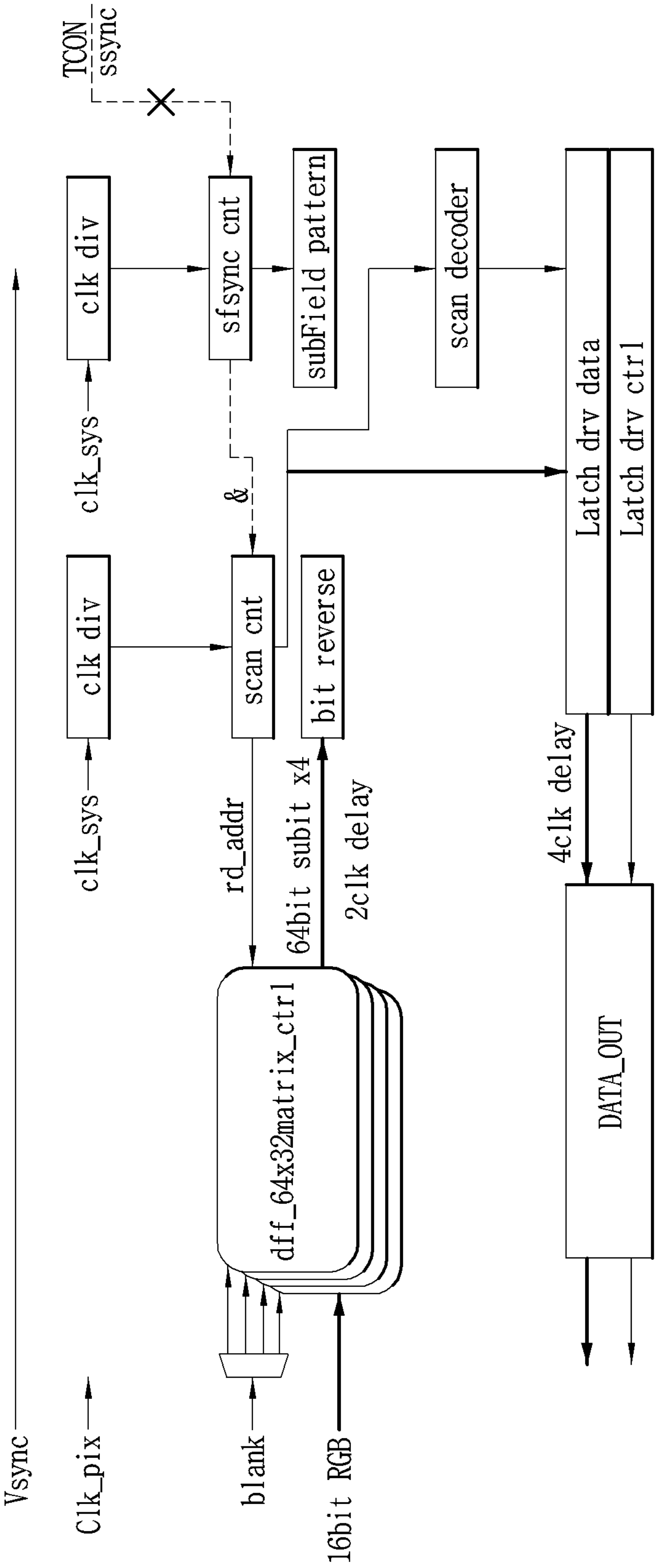
FIG. 18 is a block diagram of a display device according to the present disclosure.

FIG. 18 is a block diagram of a display device according to the present disclosure.

Referring to FIG. 18, a sub-field signal is generated by sfsgen, and sfsync_cnt counts the generated sub-field signal. Furthermore, scan cnt is synchronized with the sub-field signal to count the timing for applying a data packet. An address of the data packet is determined according to a count result of sfsync_cnt and scan cnt. Then, a data packet corresponding to the address (rd_addr) of the data packet is applied (64-bit subit×4). The data packet may be data newly mapped to 16-bit RGB data according to a predetermined rule. The data mapping rule may vary according to one sub-field time period. For example, when one sub-field time period is set to 32.66 μs, one frame may be divided into 512 sub-fields. In this case, 16-bit RGB data may be mapped using 9-bit mapping data. On the contrary, when the sub-field time period is set to 16.33 μs, one frame may be divided into 1024 sub-fields. In this case, 16-bit RGB data may be mapped using 10-bit mapping data. The data mapping rule may be set arbitrarily, and thus not specifically limited.

Meanwhile, referring to FIG. 18, in a display device according to the present disclosure, a sub-field signal is generated by an internal counter instead of an external TCON signal. As described above, since the display device according to the present disclosure is not driven by an external signal, noise can be reduced.

Figure 19:
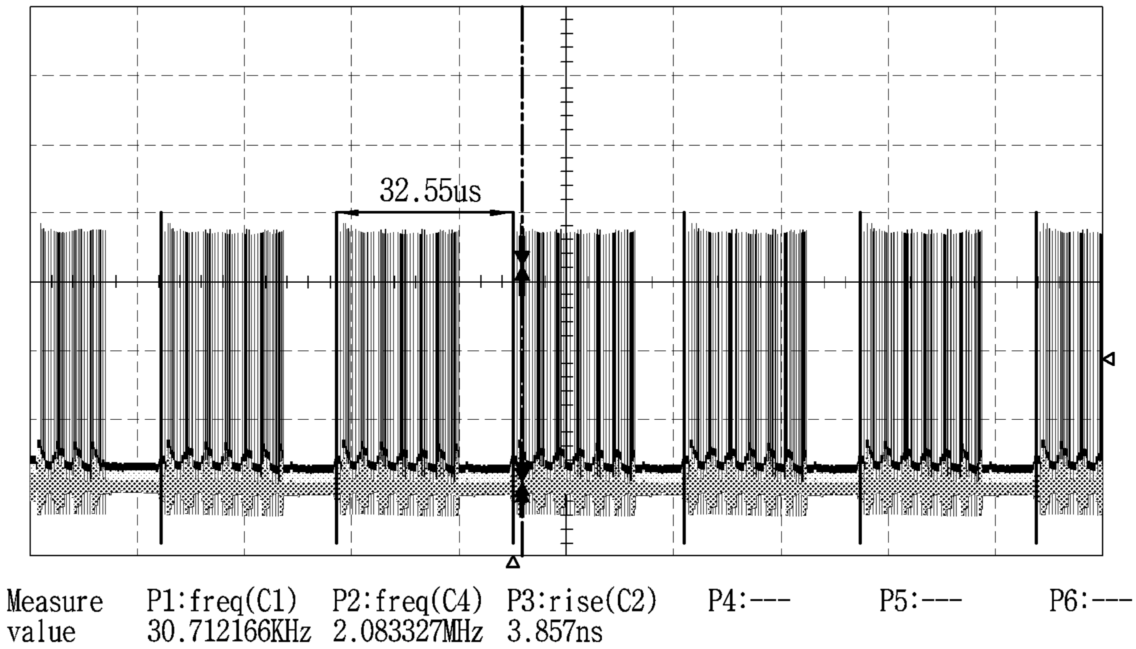
FIG. 19 is a graph showing signals generated by a display device according to the present disclosure.

Furthermore, referring to FIG. 19, it can be seen that a refresh rate of the signal is high. That is, according to the present disclosure, flicker can be reduced.

The configurations and methods according to the above-described embodiments will not be applicable in a limited way to a display device using the foregoing semiconductor light-emitting element, and all or part of each embodiment may be selectively combined and configured to make various modifications thereto.

The invention claimed is:

1. A display device comprising:

a plurality of semiconductor light-emitting elements disposed on a substrate;

flip-flops to apply an electric signal to the plurality of semiconductor light-emitting elements to allow the plurality of semiconductor light-emitting elements to maintain a light-emitting state for a predetermined time period;

scan electrodes and data electrodes electrically connected to each of the flip-flops, respectively; and a driver that generates frame synchronization signals at a predetermined time interval of one frame and generates sub-field signals at a constant subfield time period obtained by dividing the predetermined time interval of one frame by a predetermined number, receives data packets corresponding to the one frame for a time corresponding to a multiple of the predetermined number of subfield time periods, and applies a voltage to a scan electrode and a data electrode from among the scan electrodes and the data electrodes based on the data packets.

wherein, the sub-field signals generated during the predetermined time interval of one frame are generated so as not to be synchronized with the frame synchronization signals, and when a frame synchronization signal from among the frame synchronization signals is generated during a time period from a time point at which a sub-field signal from among the sub-field signals is generated to a time point at which a next sub-field signal is generated, the driver prevents a voltage from being applied to the data electrodes by separately allocating extra bits for the time period from the time point at which the sub-field signal is generated to the time point at which the next sub-field signal is generated.

2. The display device of claim 1, wherein the driver receives a data packet from among the data packets for the time period from the time point at which the sub-field signal is generated to the point at which the next sub-field signal is generated, and applies the voltage to the scan electrode and the data electrode based on the data packet.

3. The display device of claim 2, wherein the data packet comprises a block related to the data electrodes and a block related to the scan electrodes, and wherein the driver sequentially receives the block related to the data electrodes and the block related to the scan electrodes.

4. The display device of claim 3, wherein the driver applies the voltage to at least some of the scan electrodes based on the block related to the scan electrodes while applying the voltage to at least some of the data electrodes based on the block related to the data electrodes.

5. The display device of claim 4, wherein the data packets input to the driver comprise a first data packet and a second data packet, and wherein a time interval from a time point at which the first data packet starts to be input to a time point at which the driver turns on a semiconductor light-emitting element from among the plurality of semiconductor light-emitting element based on the first data packet and a time interval from a time point at which the second data packet starts to be input to a time point at which the driver turns on a semiconductor light-emitting element from among the plurality of semiconductor light-emitting element based on the second data packet are different from each other.

6. The display device of claim 1, wherein the driver separately allocates an extra bit so as not to apply the voltage to all data electrodes during the time point at which the sub-field signal is generated to the time point at which the next sub-field signal is generated.

7. The display device of claim 1, wherein a data packet from among the data packets is divided into a total of 8 blocks, and each block includes 32 bits.

8. The display device of claim 7, wherein each of the 8 blocks includes two blocks R1 and R2 related to red semiconductor light-emitting elements from among the plurality of semiconductor light-emitting elements, two blocks G1 and G2 related to green semiconductor light-emitting elements from among the plurality of semiconductor light-emitting elements, two blocks B1 and B2 related to blue semiconductor light-emitting elements from among the plurality of semiconductor light-emitting elements, and two blocks SCAN1 and SCAN2 related to the scan lines.

9. The display device of claim 8, wherein when a voltage application signal is included in a prior applied block SCAN1 between the two blocks SCAN1 and SCAN2 related to the scan lines, a corresponding semiconductor light-emitting element is turned on as the prior applied block SCAN1 is applied, and wherein when the voltage application signal is included in a later applied block SCAN2 between the two blocks SCAN1 and SCAN2 related to the scan lines, the corresponding semiconductor light-emitting element is turned on as the later applied block SCAN2 is applied.

10. The display device of claim 9, wherein a delay is generated when a next data packet is applied after the data packet including the voltage application signal for a specific scan line from among the scan lines is applied.

11. The display device of claim 10, wherein the delay is generated for every sub-field section of the data packet.

12. The display device of claim 1, wherein the time period from the time point at which the sub-field signal is generated to the time point at which the next sub-field signal is generated is a sub-field time period, and wherein the sub-field time period is about 32,55 μs.

13. The display device of claim 1, wherein a data packet from among the data packets is applied 190 ns after the sub-field signal is applied, and wherein the data packet is applied for about 28.8 μs.

14. The display device of claim 13, wherein, after the data packet is completely applied, a light-emitting state according to the applied data packet is maintained for a remaining portion of the sub-field time period.

15. The display device of claim 1, wherein the sub-field signal is generated by an internal counter.

16. The display device of claim 1, wherein, among the scan electrodes, the data electrodes, the flip flops and the plurality of semiconductor light-emitting elements:

two scan electrodes are disposed in parallel with each other;

two data electrodes are disposed in parallel with each other in a direction crossing the scan electrodes;

a flip-flop and a semiconductor light-emitting element are disposed at a position where one of the two scan electrodes and one of the two data electrodes cross each other.

17. A display device comprising:

a plurality of semiconductor light-emitting elements disposed on a substrate;

flip-flops to apply an electric signal to the plurality of semiconductor light-emitting elements to maintain a light-emitting state for a predetermined time period in the plurality of semiconductor light-emitting elements;

scan electrodes and data electrodes electrically connected to each of the flip-flops and the plurality of semiconductor light-emitting elements, respectively; and a driver that generates a frame synchronization signal and a sub-field signal, wherein the plurality of plurality of semiconductor light-emitting elements are turned-on based on the sub-field signal that is not synchronized with the frame synchronization signal.

* * * * *